United States Patent
Scherer et al.

(10) Patent No.: US 11,654,709 B2
(45) Date of Patent: May 23, 2023

(54) OPTICALLY VARIABLE SECURITY ELEMENT HAVING REFLECTIVE SURFACE REGION

(71) Applicant: GIESECKE+DEVRIENT CURRENCY TECHNOLOGY GMBH, Munich (DE)

(72) Inventors: Kai Herrmann Scherer, Munich (DE); Maik Rudolf Johann Scherer, Grainau (DE); Raphael Dehmel, Neubeuern (DE); Michael Rahm, Bad Tolz (DE); Giselher Dorff, Holzkirchen (DE); Andreas Rauch, Ohlstadt (DE); Christian Fuhse, Otterfing (DE); Tobias Sattler, Holzkirchen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 17/258,719

(22) PCT Filed: Jul. 9, 2019

(86) PCT No.: PCT/EP2019/000209
§ 371 (c)(1),
(2) Date: Jan. 7, 2021

(87) PCT Pub. No.: WO2020/011391
PCT Pub. Date: Jan. 16, 2020

(65) Prior Publication Data
US 2021/0283939 A1    Sep. 16, 2021

(30) Foreign Application Priority Data
Jul. 9, 2018 (DE) .................. 10 2018 005 474.9

(51) Int. Cl.
*B42D 25/324* (2014.01)
*G02B 30/00* (2020.01)
(Continued)

(52) U.S. Cl.
CPC ......... *B42D 25/324* (2014.10); *B42D 25/351* (2014.10); *B42D 25/373* (2014.10);
(Continued)

(58) Field of Classification Search
CPC .................................................. B42D 25/324
See application file for complete search history.

(56) References Cited

U.S. PATENT DOCUMENTS 6,060,143 A * 5/2000 Tompkin .......... G06K 19/06046
428/209
7,903,308 B2 3/2011 Commander et al.
(Continued)

FOREIGN PATENT DOCUMENTS

CN    101137514 A    3/2008
CN    101610907 A    12/2009
(Continued)

OTHER PUBLICATIONS

International Search Report and Written Opinion from PCT Application No. PCT/EP2019/000209, dated Oct. 16, 2019.
(Continued)

*Primary Examiner* — Kyle R Grabowski
(74) *Attorney, Agent, or Firm* — Workman Nydegger

(57) ABSTRACT

An optically variable security element has a multicolored, reflective areal region including a first relief structure disposed at a higher level than a second relief structure. The first relief structure has a first ink coating and the second relief structure has a second, different ink coating. The two relief structures overlap in an overlap region. The first ink coating of the first relief structure is disposed at a higher
(Continued)

level in the overlap region and has at least one recess the dimension of which is more than 140 μm. The first ink coating comprises an edge region adjoining the recess, and as a bicolor register feature the first relief structure lets the edge region of the first ink coating appear with a first color impression and the second relief structure through the recess lets the second ink coating appear with a second, different color impression in mutual register.

18 Claims, 3 Drawing Sheets

(51) Int. Cl.
| | |
|---|---|
| *B42D 25/351* | (2014.01) |
| *B42D 25/373* | (2014.01) |
| *B42D 25/378* | (2014.01) |
| *B42D 25/425* | (2014.01) |
| *G02B 5/18* | (2006.01) |
| *B42D 25/23* | (2014.01) |
| *B42D 25/24* | (2014.01) |
| *B42D 25/26* | (2014.01) |
| *B42D 25/29* | (2014.01) |
| *B42D 25/445* | (2014.01) |

(52) U.S. Cl.
CPC ......... *B42D 25/378* (2014.10); *B42D 25/425* (2014.10); *G02B 5/1828* (2013.01); *G02B 5/1842* (2013.01); *G02B 30/00* (2020.01); *B42D 25/23* (2014.10); *B42D 25/24* (2014.10); *B42D 25/26* (2014.10); *B42D 25/29* (2014.10); *B42D 25/445* (2014.10)

(56) References Cited

U.S. PATENT DOCUMENTS

| | | | |
|---|---|---|---|
| 8,403,368 B2 | 3/2013 | Tompkin et al. | |
| 9,007,669 B2 | 4/2015 | Heim | |
| 9,176,266 B2 | 11/2015 | Fuhse et al. | |
| 9,266,371 B2 | 2/2016 | Toda et al. | |
| 9,933,551 B2 | 4/2018 | Toda et al. | |
| 10,525,759 B2 | 1/2020 | Rahm et al. | |
| 10,870,305 B2 | 12/2020 | Fuhse et al. | |
| 2008/0231976 A1 | 9/2008 | Commander et al. | |
| 2008/0258456 A1 | 10/2008 | Rahm et al. | |
| 2010/0001508 A1 | 1/2010 | Tompkin et al. | |
| 2010/0045024 A1* | 2/2010 | Attner | B42D 25/351 427/7 |
| 2010/0080938 A1 | 4/2010 | Toda et al. | |
| 2011/0007374 A1 | 1/2011 | Heim | |
| 2011/0079997 A1 | 4/2011 | Heim | |
| 2012/0319395 A1 | 12/2012 | Fuhse et al. | |
| 2013/0099474 A1 | 4/2013 | Fuhse et al. | |
| 2016/0121641 A1 | 5/2016 | Toda et al. | |
| 2017/0023711 A1* | 1/2017 | Jiang | G02B 5/1842 |
| 2021/0070088 A1 | 3/2021 | Fuhse et al. | |
| 2021/0283939 A1 | 9/2021 | Scherer et al. | |

FOREIGN PATENT DOCUMENTS

| | | | | |
|---|---|---|---|---|
| CN | 101680978 | A | 3/2010 | |
| CN | 101952128 | A | 1/2011 | |
| CN | 102712207 | A | 10/2012 | |
| CN | 103068526 | A | 4/2013 | |
| CN | 105263719 | A | 1/2016 | |
| CN | 108025584 | A | 5/2018 | |
| DE | 69636991 | T2 | 12/2007 | |
| DE | 102008017652 | A1 * | 10/2009 | B42D 25/00 |
| EP | 3216620 | A1 | 9/2017 | |
| JP | 2012155027 | A | 8/2012 | |
| WO | 2007079851 | A1 | 7/2007 | |
| WO | 2012000669 | A1 | 1/2012 | |

OTHER PUBLICATIONS

Search Report from corresponding DE Application No. 102018005474.9, dated Mar. 15, 2019.
Chinese Office Action in corresponding Chinese Patent Application No. 201980035864A, dated Sep. 23, 2021.

* cited by examiner

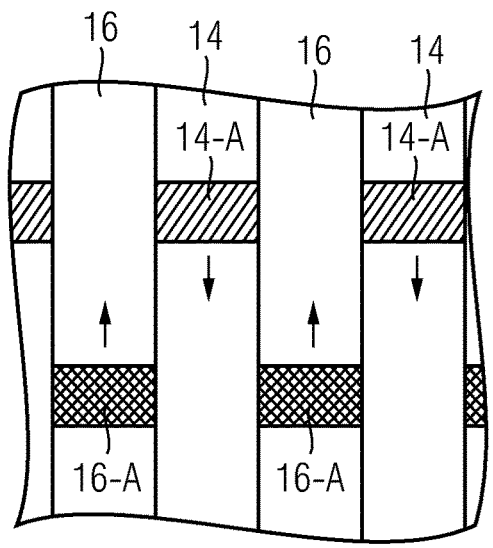
Fig. 4
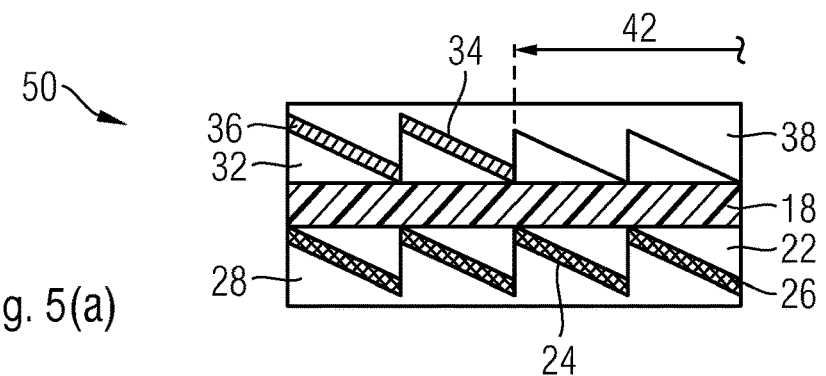
Fig. 5(a)
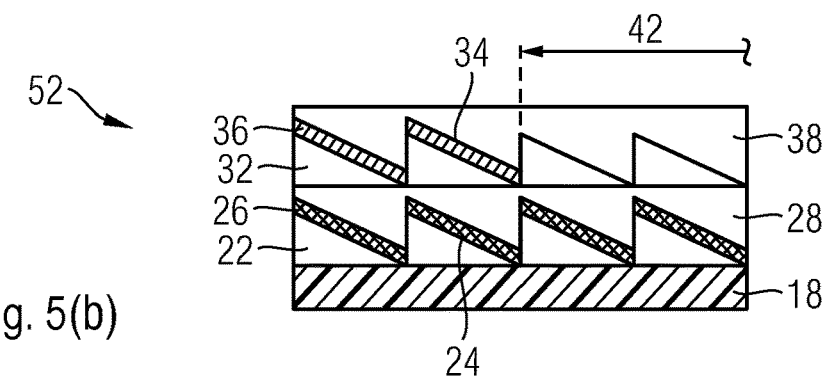
Fig. 5(b)
Fig. 5

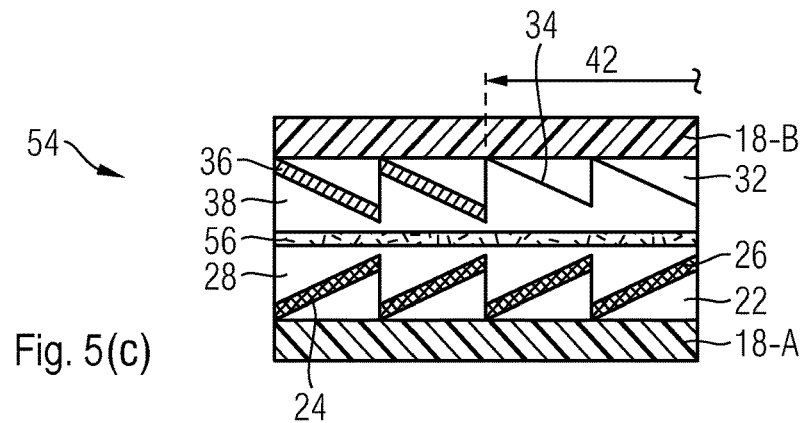
Fig. 5(c)
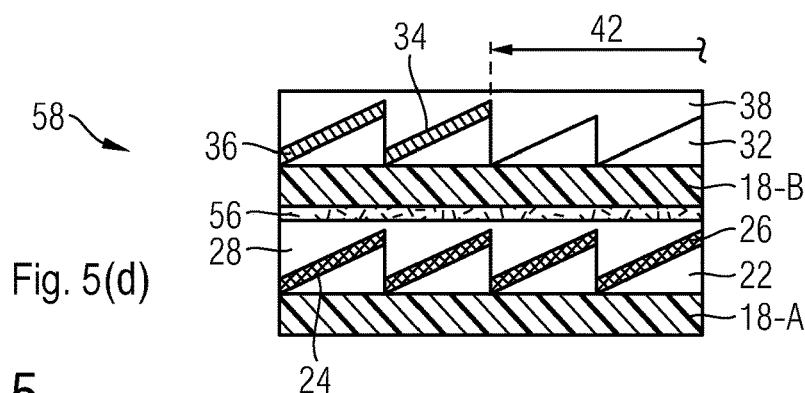
Fig. 5(d)
Fig. 5
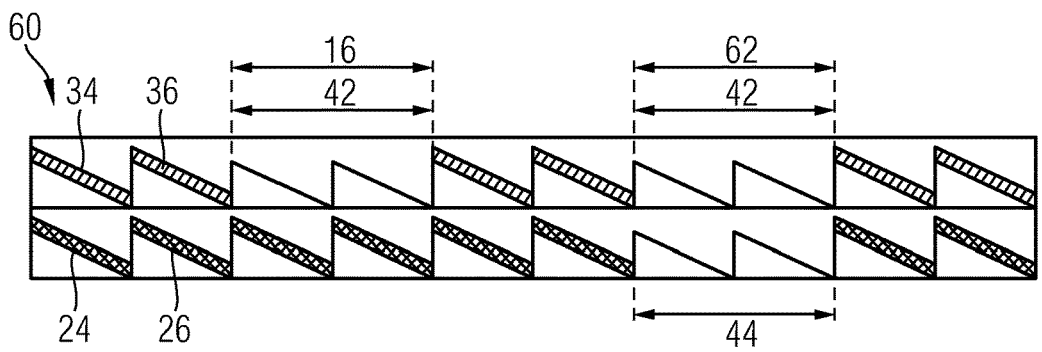
Fig. 6
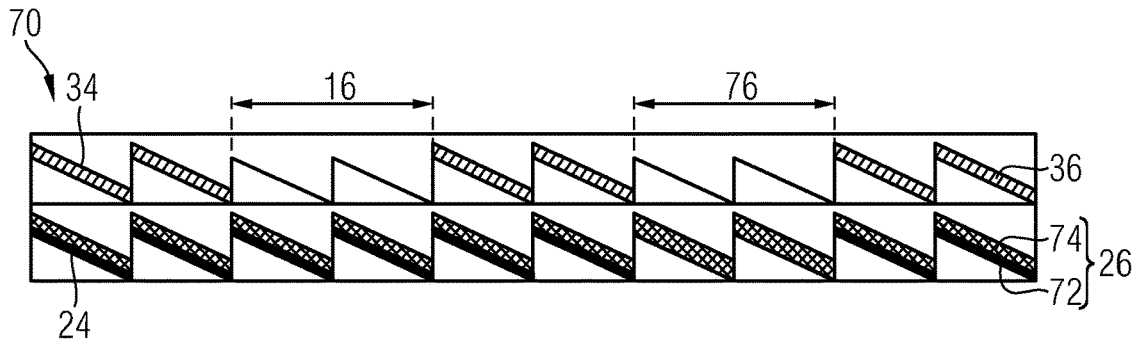
Fig. 7

OPTICALLY VARIABLE SECURITY ELEMENT HAVING REFLECTIVE SURFACE REGION

BACKGROUND

The invention relates to an optically variable security element for securing value objects with an areal carrier and a reflective areal region arranged on the carrier. The invention also relates to a method for manufacturing such a security element and a data carrier equipped with such a security element.

Data carriers, such as value documents or identity documents, but also other value objects, such as branded articles for instance, are often supplied for securing purposes with security elements which permit a verification of the authenticity of the data carrier and which at the same time serve as protection from unauthorized reproduction. The security elements can be configured, for example, in the form of a security thread embedded in a banknote, a cover foil for a banknote with a hole, an applied security strip, a self-supporting transfer element or also in the form of a feature region printed directly onto a value document.

A special role in authentication assurance is played by security elements with viewing angle-dependent effects, because these cannot be reproduced even with the most modern copying devices. The security elements are equipped for this purpose with optically variable elements which convey a different image impression to the viewer from different viewing angles, showing, for example, a different color impression or brightness impression and/or a different graphic motif depending on the viewing angle. In the prior art, for example, movement effects, pumping effects, depth effects or flip effects are described as optically variable effects, which are implemented with the aid of holograms, microlenses or micromirrors.

SUMMARY

Proceeding from this, it is the object of the invention to further increase the security against forgery and the visual attractiveness of generic optically variable security elements and, in particular, to make available optically variable security elements with two or more different appearances and/or effects in different colors and in perfect register.

To achieve the mentioned object, the invention includes an optically variable security element, in particular for securing value objects, with a multicolored reflective areal region, wherein the area of the security element or of the reflective areal region defines a z axis standing perpendicularly thereon. The reflective areal region includes a first relief structure disposed at a higher level and a second relief structure disposed at a lower level, which are arranged at different height levels in the z direction.

The first relief structure is supplied with a first ink coating and the second relief structure is supplied with a second, different ink coating. The two relief structures overlap in an overlap region.

The first ink coating of the first relief structure disposed at a higher level has at least one recess in the overlap region, the dimension of which is more than 140 μm. The first ink coating accordingly comprises an edge region the adjoins the recess.

As a bicolor register feature, the first relief structure lets the edge region of the first ink coating appear with a first color impression and the second relief structure lets the second ink coating appear through the recess with a second, different color impression in mutual register.

The dimensions of the recess in the overlap region are advantageously more than 140 μm, in particular more than 250 μm or even more than 500 μm or 1 mm. The recess thus extends over a multiplicity of partial elements of the relief structure. The dimensions mentioned can be exceeded by the recesses only in a lateral direction; however, advantageously, the recesses are larger than the mentioned dimensions in every lateral direction. Particularly advantageously, the dimensions are above the resolution limit of the naked eye, so that their areal region can be recognized without aids.

The edge region of the first ink coating adjoins the recess on at least two sides. Preferably, the edge region encloses the recess.

The relief structures are preferably embossed structures. In particular, embossing in a curable layer, such as only for example UV lacquers, is further preferred. Alternative generation methods, such as, for example, subtractive lasering or additive construction, for example using 3D printing, are conceivable but less cost-effective.

In an advantageous variant of the invention, the reflective areal region includes exactly two relief structures, which are each arranged at a specific height level.

However, according to a likewise advantageous variation, it is also possible to arrange at least a part of the relief elements of a relief structure (embossed elements of an embossed structure) at different heights in order to thereby optimize the effective reflector area of the relief structure. If, for example, in an arrangement on two height levels, one reflector of the relief structure disposed at a lower level is partially occluded from a relevant effect direction by a reflector of the relief structure disposed at a higher level, in order to remedy this, the reflector of the relief structure disposed at a lower level can be displaced upward and/or the reflector of the relief structure disposed at a higher level can be displaced downward. The reflectors are preferably displaced upward or downward at the same lateral position of the x-y plane without changing their relief profile in the z direction in order to reduce the occlusion. The displacement advantageously is less than 80%, in particular less than 60%, of the distance of the height levels involved. Alternatively, or additionally, the reflectors can also be displaced in their lateral position in order to reduce the occlusion.

Preferably, the first and/or second relief structure of the polychromatically reflective areal region together with its ink coating forms a first and/or second monochromatically reflective relief structure. For a viewer, the bicolor register feature appears at least at one viewing angle that differs from the z direction. The ink coatings presently appear in colored, reflective manner in dependence on the viewing angle. At the viewing angle, the light is reflected from the relief structure to the viewer and thus appears in the present sense, wherein the ink coating determines the color impression. Since the impinging light also has a preferred direction—in particular substantially perpendicular—a clearly perceptible colored light reflex is created for the observer, as is known.

Preferably, for the viewer the ink coatings appear in mutual register in a viewing angle range that comprises the first viewing angle or at a second viewing angle.

Alternatively, or additionally, for a viewer at least one of the two relief structures does not appear in color in a second viewing angle range or at a third viewing angle.

In further embodiments, the second ink coating can appear either over the full area or partially, namely only adjoining the edge region, in a viewing region defined by the recess and a viewing angle.

The bicolor register feature can form an independent, optically variable feature. Both relief structures are adapted to jointly produce the independent, optically variable feature. For example, the bicolor register feature can move along the recess edge. The independent, optically variable feature can, for example, be dependent on the viewing angle: static, in particular statically three-dimensional and/or statically floating, or dynamic, in particular three-dimensional in a moving manner and/or floating in a moving manner. An optically variable feature in an inside region of the recess can be static, three-dimensional and/or moved in different manner. Likewise, the bicolor register feature can be integrated in an optically variable feature of the reflective areal region. A static, three-dimensional and/or moved feature in the recess forms the bicolor register feature together with the edge region. Alternatively, the bicolor register feature can comprise through the two relief structures two mutually matched, different optically variable partial features. The two optically variable features can in particular be chosen from optically variable features which preferably differ with respect to one of several groups of characteristics: static/dynamic, flat/three-dimensional and/or disposed in the substrate plane/floating above or below the substrate plane. The exact registration of the two color impressions and of the optical variability (and/or the effect) can thus be emphasized specially.

The reflective areal region usually comprises more than the one recess; preferably two, three or more than three recesses. The bicolor register feature is present accordingly in each of these recesses. The recesses are mutually matched in order to form an optically variable feature of the reflective areal region. For example, the recesses have the same shape and/or appear with the second color impression at different viewing angles, in particular of a viewing angle range.

In further parts of the overlap region or outside the overlap region, other ink coatings, in particular with a third and/or a fourth color impression, can be employed. In further recesses, differently bicolor register features, in particular with a third (together with the first or second) color impression or with a third and fourth color impression, can be present. Likewise, one of the (first, second, third or fourth) ink coatings outside the register feature or outside the overlap region can have a different chromatic color tone.

The relief structures are preferably micromirror arrangements, in particular micromirror arrangements with directional micromirrors. The micromirror arrangement(s) is (are) achromatic micromirror arrangement(s), which in particular is (are) non-diffractive. The directional mirrors of the micromirror arrangement are distinguished by a preferred reflection direction which can be set, for example, by means of an inclination angle and/or azimuth angle. Arrangements of small, ray-optically effective reflective facets, which direct impinging light like little mirrors into a reflection direction given by the condition "impingement angle equals angle of reflection", are referred to as micromirror arrangements. The individual directional micromirrors of the micromirror arrangement reflect either the light to the viewer or not (bright or dark), depending on their orientation for the viewing angle. Only through the ink coating does the micromirror appear chromatically reflective or not (chromatically bright or dark). Since the micromirror arrangements represent embossed structures, they are also referred to as micromirror embossings in the present description. Planar micromirrors are particularly suitable as directional micromirrors. Alternatively, directional concave mirrors and/or directional Fresnel-like mirrors can be employed.

In micromirror arrangements the micromirrors are advantageously formed with an edge length between 4 µm and 100 µm, preferably between 5 µm and 30 µm. The micromirrors preferably have a (maximum) pitch of less than 20 µm, in particular less than 10 µm, further preferably less than 5 µm. The micromirrors are preferably arranged in one or both in micromirror arrangements in a periodical grid with a period length between 4 µm and 100 µm, preferably between 5 µm and 30 µm.

Areas oriented only in parallel or perpendicularly to the polychromatically reflective areal region are not directional micromirrors in the present sense. The directional micromirrors can be regularly or irregularly configured (e.g. same shape or varying shape) and/or arranged (e.g. in a pattern or distributed quasi-randomly).

The two relief structures of the reflective areal region are advantageously each characterized by a maximum pitch, wherein the distance between adjacent height levels in the z direction is greater than the maximum pitch of the relief structure region respectively disposed at a lower level. The distance is preferably greater than 150%, particularly preferably 200%, of the maximum pitch. Further preferably, the distance between adjacent height levels in the z direction is between 150% and 750%, particularly preferably between 200% and 500%, further preferably between 200% and 400% of the maximum pitch of the relief structure region disposed at a lower level.

If the relief structures are formed, for example, by micromirror arrangements, the pitch of the micromirrors depends on their lateral dimensions and their angles of inclination. Even with the same lateral dimensions, the angles of inclination of the micromirrors are typically different, so that the micromirrors have different pitches. However, the maximum pitch of its micromirrors is characteristic of the micromirror arrangement. The above-mentioned maximum pitches ("pitch less than") are preferred. For example, if the micromirrors have an edge length of 10 µm and a maximum angle of inclination of 30°, then the maximum pitch of the micromirror arrangement is given by $$G_{max}=10\mu m*\tan(30°)=5.8\mu m,$$

wherein the individual micromirrors can have a pitch between 0 and $G_{max}$ depending on the angle of inclination. The distance of the micromirror arrangement to the micromirror arrangement disposed above it is then advantageously greater than 5.8 µm and is in particular between 8.7 µm (150% of $G_{max}$) and 23.2 µm (400% of $G_{max}$). As a rule, the micromirrors have a uniform size, in particular edge length. In other preferred embodiments, the micromirrors of the micromirror arrangement have one maximum pitch, but different edge lengths. If a smaller edge length is chosen for micromirrors with a greater angle, a smaller maximum pitch can be maintained. Preferably, micromirrors with an angle of inclination below a critical angle with a uniform size (or edge length) and micromirrors with an angle of inclination above the critical angle with reduced size (or edge length) are provided. In the example computed above with $G_{max}$=5.8 µm in a micromirror arrangement, in this way micromirrors up to a maximum inclination of approximately 49 degrees can be present, if their edge length is only 5 µm instead of 10 µm.

Even if the procedure was explained on the basis of micromirror arrangements, a maximum pitch of the embossed structure regions can also be determined analogously for other embossed relief structures.

The ink coatings of the relief structure regions are formed by glazing inks in advantageous embodiments. Metallizations, for example of aluminum, silver or an alloy, such as copper and aluminum, are also possible, as are thin-film structures, in particular color-shifting thin-film structures, color-stable, color-filtering thin-film structures (different colors in remission and transmission) or silicon-aluminum thin films. The ink coatings can also be formed by glazing inks backed with a metallic mirror coating, for example of aluminum. The ink coatings can represent a glazing image of several glazing inks, which is backed with a mirror coating, for example of aluminum. Luminescent inks, in particular fluorescent inks with a metallic mirror coating, are also conceivable as ink coatings. The ink coatings can also be formed by structural inks. Finally, nanoparticle inks are also conceivable as ink coatings, such as gold-blue particles, various effect pigments, color-shifting pigments or supersilver.

An ink coating preferably follows the relief course of its relief structure. One surface (or both surfaces) of the ink coating follows the relief structure. The second surface of the ink coating (s) preferably also follows the relief structure. Alternatively, the second surface can be configured to be planar. In a further alternative—which is more difficult to manufacture—, the second surface of the ink coating comprises a chromophore chromatic structure, such as a sub-wavelength, nano or binary structure. The ink coatings are preferably applied directly to the relief structures, in particular the micromirror arrangements. Different ink coatings can also be present in certain regions next to one another or one above the other. In the case of ink coatings of multi-layered configuration, for example a glazing ink with background metallization, it is, however, also possible that only some of the several layers, for example the background metallization, are applied directly to the relief structures. The remaining part of the layers, for example the glazing ink, can then be arranged above the relief structures, for example between the coated relief structure region and the adjacent relief structure region disposed at a higher level. The second surface of a reflective partial layer of the ink coating(s) preferably also follows the relief structure. The second surface of a glazing ink partial layer of the ink coating(s) can also follow the relief structure, be configured to be planar or follow the other relief structure. The remaining part of the layers can also be combined with further layers. For example, the embossing lacquer for the adjacent relief structure region disposed at a higher level can be dyed and thus represent a continuous ink partial coating for the relief structure region disposed at a lower level. The lower surface of the (first) dyed embossing lacquer preferably follows the lower relief structure and the upper surface of the dyed embossing lacquer forms the upper (first) relief structure.

The color impressions of the first and second ink coatings are different; they differ in their color tone. Both ink coatings preferably produce a chromatic color tone. Alternatively, one of the two ink coatings can produce an achromatic color tone, preferably silvery, for the viewer, and the other a chromatic color tone.

In addition to the ink coating of the relief structure region disposed at a higher level, the ink coating of the relief structure region disposed at a lower level can be present only in certain regions. Ink coatings present in certain regions can either be applied in certain regions and/or selectively removed again after full-area application. Some advantageous methods are described below with which the above-mentioned ink coatings can be provided only in certain regions. It is known to the person skilled in the art that not every method is suitable for all types of ink coatings. In particular, if several different ink coatings are used in a security element, several different methods can also be applied for the structuring.

Structured ink coatings with metallic inks, thin-film inks, structural inks or nanoparticles can be produced, for example, by using a washing ink. For this purpose, washing ink is printed for the respective relief structure in insetter printing, then metalized over the full area and afterwards washed. In order to avoid a possibly present tolerance when printing the washing ink, the relief structure can be further adjusted. The relief structure can comprise in certain regions a fine structure that reduces (and/or increases) adhesion, which in particular has a hydrophobic (or hydrophilic) effect. The adhesion-reducing fine structure in one region thus in particular prevents the washing dye from adhering in the region. A first region with an adhesion-reducing fine structure can optionally adjoin a second region with an adhesion-increasing fine structure. Employing an optionally dyed etching resist is particularly advantageous in combination with glazing inks. For this purpose, the relief structure can first be completely coated, then the etching resist is printed, wherein desired regions remain unprinted and finally the coating is etched. By applying a laser, in particular metallic inks, metallic mirror coatings and laser-sensitive, glazing inks can be removed with high resolution in certain regions. A light-absorbing fine structure, such as, for example, moth-eye structures or quasi-random structures, can be provided in certain regions in the relief structure. This increases the absorption of light so that lasers no longer have to be employed. Normal light sources such as UV lamps or LEDs can also be employed for removal. Metallic flakes, nanoparticle ink or supersilver (usually nanoscale aluminum particles) can be printed directly in register. Instead of the above-mentioned etching resist, an optionally dyed photo resist can first be applied over the full area and then exposed in certain regions. Depending on the resist employed, the exposed or unexposed regions then dissolve in the etching bath, so that the metal disposed underneath dissolves while the metallic areas covered by the photo resist remain protected from the etching.

Ink coatings can also be produced by a metal transfer process. Regions that are to be demetalized are high embossed with the aid of an embossing tool. The foil pretreated in this way is then completely metalized and the metal on the high-embossed places is selectively peeled off again with another foil so that only metal remains in the depressions. A ink transfer can also be produced in a similar manner. Regions that are later to appear colored are high embossed in relation to the remaining regions. A colorant, for example flakes, nanoparticle ink, supersilver or a glazing ink, is applied to a roller and selectively transferred to the high-embossed regions of the foil. Conversely, in a ink filling method, a desired ink coating is produced in that regions that are later to appear colored are deep-embossed in relation to the remaining areas. A colorant, for example flakes, nanoparticle ink, supersilver or a glazing ink, is printed over the full area and then peeled off with a hard-adjusted chambered doctor blade or wiped off with a cloth, so that ink only remains in the depressions.

The security element described can additionally be equipped with colorless or colored negative markings. For this purpose, it can be provided in particular that the overlap region additionally includes partial regions with a negative marking, in which the ink coating of the relief structure region disposed at a higher level and at least partially also the ink coating of the relief structure region disposed at a lower level is recessed.

The ink coating of the relief structure region disposed at a lower level in the negative marking partial regions can be completely recessed, so that the negative marking does not produce any of the color impressions of the two ink coatings. The negative marking appears in particular colorless and can be recognized particularly well in transmitted light.

In another configuration, the ink coating of the relief structure region disposed at a lower level is configured to be multilayered, wherein at least one of the multiple layers is recessed in the negative marking partial regions, so that a colored negative marking is created. The ink coating of the relief structure region disposed at a lower level advantageously includes an opaque partial layer, in particular a metallization, and a translucent ink layer, wherein the opaque partial layer but not the translucent ink layer is recessed in the negative marking partial regions, so that a negative marking with the color effect of the translucent ink layer is created.

The line widths of the recesses of a negative marking disposed one above the other are advantageously above 100 µm, preferably above 150 µm, particularly preferably above 300 µm, in order to ensure that the negative marking can be easily recognized.

In a negative marking, the recesses in the ink coating of the relief structure region disposed at a lower level are advantageously formed with a slightly larger area than the recesses in the ink coating of the relief structure region disposed at a higher level in order to compensate for register fluctuations between the two relief structure regions.

In an advantageous embodiment, the relief structure regions are arranged on opposite sides of a transparent carrier foil. Alternatively, relief structure regions are arranged one above the other on the same side of a, preferably transparent, carrier foil. The relief structure regions can be arranged directly one above the other, or be separated from one another by an adhesive layer, for example a laminating adhesive layer or a laminating foil. The laminating foil can also form the areal carrier of the security element. After the security element has been applied to a target data carrier, the carrier of the target data carrier can also represent the areal carrier of the security element.

The invention further includes a data carrier with a security element of the type described. The data carrier can be in particular a value document, such as a banknote, in particular a paper banknote, a polymer banknote or a foil composite banknote, a share, a bond, a deed, a voucher, a check, a high-quality admission ticket, but also an identification card, such as a credit card, a bank card, a cash card, an authorization card, a personal identity card or a passport personalization page.

Finally, the invention also includes a method for manufacturing an optically variable security element, preferably of the type described above, in which

- a carrier is made available, the areal expansion of which defines an x-y plane and a z axis standing perpendicularly thereon,
- the carrier is supplied with a multicolored, reflective areal region, which is formed with at least two relief structures, which are arranged in the z direction at different height levels with reference to the areal carrier and are arranged in an overlapping manner,
- the two relief structures are supplied with different ink coatings, and
- the ink coating of the relief structure disposed at a higher level in the overlap region is configured with a recess the dimensions of which is more than 140 µm, wherein the ink coating of the relief structure disposed at a higher level comprises an edge region adjoining the recess, and
- as a bicolor register feature, the first relief structure is configured so that the edge region of the first ink coating with a first color impression and the second relief structure is configured such that the second ink coating appears through the recess with a second, different color impression appear in mutual register.

For the sake of completeness, it should be noted that the color impression resulting for the viewer is determined by the ink coating, so that the present relief structures could also be referred to as achromatic relief structures. No relief structures in the present sense are chromatic structures such as diffraction gratings, sub-wavelength gratings or blazed gratings which filter, diffract and/or reflect white light in a wavelength-selective manner and produce their own color impression for the viewer. In embodiments, the carrier can be part of the security element. In other embodiments, the security element is removed from the carrier, for example when the security element is transferred from the carrier to a target substrate.

BRIEF DESCRIPTION OF THE DRAWINGS

Further embodiment examples as well as advantages of the invention will be explained hereinafter with reference to the figures, in whose representation a rendition that is true to scale and to proportion has been dispensed with in order to increase the clearness.

There are shown.

DETAILED DESCRIPTION OF VARIOUS EMBODIMENTS

Figure 1:
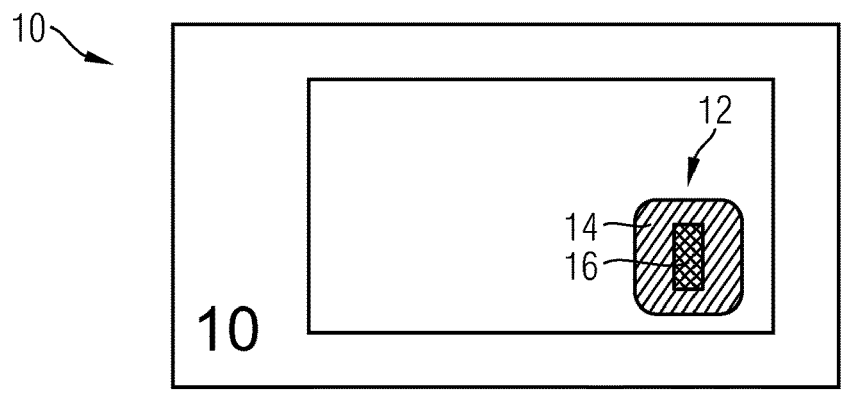
FIG. 1 a schematic representation of a banknote with a security element according to the invention, FIG. 2 schematically a detail of the security element of FIG. 1 in cross section, FIG. 3 a plan view of a detail of the security element of FIG. 1, FIG. 4 a variation of the configuration of the FIGS. 2 and 3, in which the ink coating of the micromirror arrangement disposed at a higher level has alternating, strip-shaped recesses and equally sized, strip-shaped remaining regions, FIG. 5, including FIGS. 5(a) to 5(d), some advantageous foil structures of security elements according to the invention, FIG. 6 a security element according to the invention with a additional region with a colorless negative marking, and FIG. 7 a security element according to the invention with a additional region with a colored negative marking.

The invention will now be explained on the basis of the example of security elements for banknotes. FIG. 1 shows a schematic representation of a banknote 10 with an optically variable security element 12 according to the invention in the form of an adhesively bonded transfer element. It goes without saying, however, that the invention is not limited to transfer elements and banknotes but can be used for all types of security elements, for example for labels on goods and packaging or for securing documents, identity cards, passports, credit cards, health cards and the like. In the case of banknotes and similar documents, in addition to transfer elements (patch with or without their own carrier layer), security threads or security strips, for example, are also conceivable.

The security element 12 shown in FIG. 1 itself is configured to be very flat, but still conveys to the viewer the three-dimensional impression of a motif 14 apparently bulging out of the plane of the banknote 10, with the motif appearing with a first color, for example blue. The motif 14 can represent, for example, a value number, a portrait or another graphic motif. Within the blue motif 14 in a partial region 16 a movement effect in a second color is visible, for example a partial region 16 in which a bright red bar appears to move up and down along the partial region, producing a so-called rolling-bar effect, when the bank note 10 is tilted. As a substantial special feature the areas of different colors (red or blue) and different effects (three-dimensional motif or running bar) therein are disposed in exact mutual register. This registration is therefore also referred to as color-to-effect registration in the following.

Figure 2:
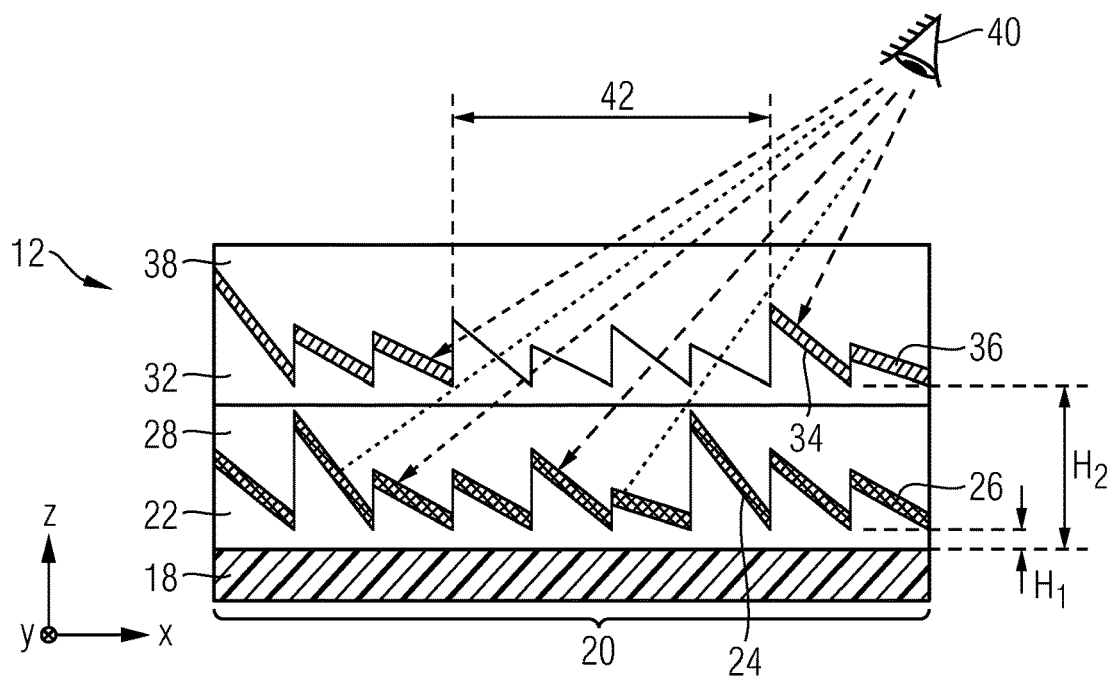

The special structure of optically variable security elements according to the invention is now explained in more detail with reference to the FIGS. 2 and 3, wherein FIG. 2 shows a detail of the security element 12 schematically in cross section and FIG. 3 for the purpose of illustration of the visual appearance shows a plan view of a detail of the security element 12.

Referring first to the cross section of FIG. 2, the security element 12 includes an areal carrier 18, the areal expansion of which defines an x-y plane and a z axis standing perpendicularly thereon.

A multicolored reflective areal region 20 is arranged on the carrier 18 and includes two embossed structure regions 24, 34 which are arranged in the z direction at two specific, different height levels with reference to the areal carrier 20. In the embodiment example, the embossed structure regions each represent micromirror embossings or micromirror arrangements 24, 34 which are each formed from a multiplicity of micromirrors inclined with respect to the x-y plane. The local angles of inclination of the micromirrors are chosen exactly such here that the relief structure of the micromirror arrangements 24, 34 after the ink coating produce a desired optical appearance, for example the bulging three-dimensional impression of the motif 14 or the rolling-bar effect of the partial region 16. The different height levels are given by the different heights $H_1$, $H_2$ of the base areas of the micromirror arrangements 24, 34 above the carrier 18.

For producing a visual contrast of the desired color effect, the micromirror arrangements 24, 34 are each supplied with an ink coating 26, 36, which produce the different color impression of the micromirror arrangements for the viewer 40. In the embodiment example, the lower micromirror arrangement 24 is coated with a red glazing ink 26, while the upper micromirror arrangement 34 is coated with a blue glazing ink 36.

The micromirror arrangements 24, 34 are each embossed into a transparent embossing lacquer layer 22, 32 and, after the application and optionally structuring of the respective ink coating 26, 36, are leveled with a transparent top-coat lacquer layer 28 or 38, respectively. The top-coat lacquer layers have substantially the same refractive index as the embossing lacquer layers 22, 32, so that the micromirrors in regions without an ink coating do not appear visually due to the lack of refractive index difference between the embossing lacquer layer and the top-coat lacquer layer.

The security element 12 is constructed for viewing from above (or in reflection), so that the micromirror arrangement 24 further away from the viewer 40 is referred to as the micromirror arrangement disposed at a lower level and the micromirror arrangement 34 lying closer to the viewer 40 is referred to as the micromirror arrangement disposed at a higher level.

In the embodiment example, the two micromirror arrangements 24, 34 are arranged one above the other in the entire areal region 20 of the security element 12. In the partial region 16 the ink coating 36 of the micromirror arrangement disposed at a higher level 34 has a large-area recess 42, for example in the shape of a 5 mm wide and 2 cm long curved strip. In the region of the recess 42 the micromirrors of the micromirror arrangement 34 develop no optical effect due to the lack of refractive index difference between the lacquer layers 32, 38, so that the viewer 40 looks through these lacquer layers at the micromirror arrangement disposed at a lower level 24 with its red ink coating 26. Outside the recess 42, the visual impression of the areal region 20, on the other hand, is determined by the micromirror arrangement disposed at a higher level 34 with its blue ink coating 36.

Figure 3:
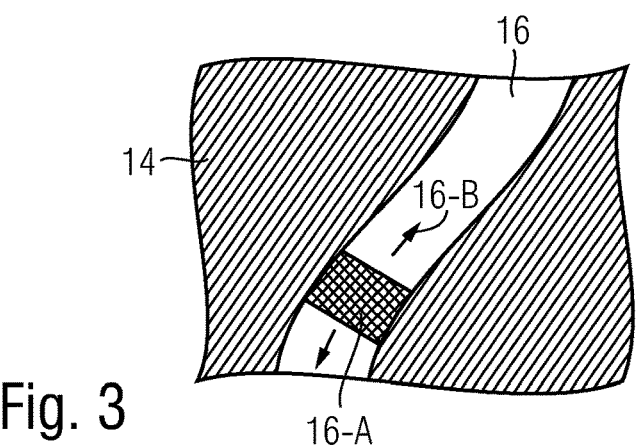

As illustrated in FIG. 3, the viewer therefore perceives outside the recess 42 the blue motif 14 produced by the micromirror arrangement 34, while within the recess 42, in the partial region 16, the red rolling-bar effect appears, in which a bright bar 16-A appears to run back and forth in the direction of the arrow 16-B when the banknote 10 is tilted. The height difference of the two micromirror arrangements 24, 34 is in the range of a few micrometers or a few tens of micrometers and is therefore imperceptible to the viewer 40. The two differently colored motifs and the different effects 14, 16 therefore appear to be arranged next to one another in exact register for the viewer 40. As represented in FIG. 2 for the viewer 40 by the two dotted lines, the exact register is given here on both sides of the recess 42.

FIG. 4 shows a variation of the configuration of the FIGS. 2 and 3, in which the ink coating 36 of the micromirror arrangement disposed at a higher level 34 has alternating, strip-shaped recesses 42 and equally sized, strip-shaped remaining regions. In the embodiment example of FIG. 4 the local angles of inclination of the micromirrors of the micromirror arrangements 24, 34 are chosen so that the micromirror arrangements each produce a rolling-bar effect with mutually contrary running direction. When the security element is tilted, the viewer sees a blue rolling-bar effect in the partial regions 14, in which the blue ink coating 36 has remained, and a red rolling-bar effect in the recesses of the partial regions 16 in exact register thereto. The blue bars 14-A and the red bars 16-A respectively move in opposite directions for the viewer, as illustrated in FIG. 4.

Some advantageous foil structures of security elements according to the invention are shown in FIG. 5.

In the security element 50 of FIG. 5(a), a transparent embossing lacquer layer 22, 32 with the desired micromirror embossing 24, 34, the ink coating 26, 36 and the transparent top-coat lacquer layer 28, 38 is arranged on the two opposite sides of a transparent PET carrier foil 18. The security element 50 is constructed for viewing from the side of the ink coating 36, so that the ink coating 36 of the micromirror arrangement disposed at a higher level 34 is supplied with large-area recesses 42 in which the viewer looks at the micromirror arrangement disposed at a lower level 24 with the ink coating 26.

The security element 52 of FIG. 5(b) has the layer structure already described for FIG. 2. Both micromirror embossings 24, 34 are arranged on the same side of the carrier foil 18, which does not have to be transparent in this embodiment. On the carrier foil there are arranged in this order the first embossing lacquer layer 22 with the first micromirror embossing disposed at a lower level 24, the first ink coating 26, the first transparent top-coat layer 28, the second, transparent embossing lacquer layer 32 with the second, micromirror embossing disposed at a higher level 34, the second ink coating 36 and the second transparent top-coat layer 38. The security element 52 is constructed for viewing from the side of the ink coating 36, so that the ink coating 36 of the micromirror arrangement disposed at a higher level 34 is supplied with large-area recesses 42, in which the viewer looks at the micromirror arrangement disposed at a lower level 24 with the ink coating 26.

Further variants of FIG. 5*b* are not shown separately in the figures. A transparent foil can also be arranged above the further layers 22, 26, 28 and 32, 36, 38. The transparent foil can be the carrier foil 18 of the security element, a further carrier foil or serve as a protective foil. The order of the further layers 22, 26, 28 and 32, 36, 38 can be unchanged. Alternatively, the first embossing lacquer layer 22 can be disposed above the first top-coat layer 28 and/or the second embossing lacquer layer 32 can be disposed above the second top-coat layer 38. Below the transparent foil 18 arranged above, for example, the further layers follow in the order 32, 36, 38, 22, 26, 28.

Independently of the position of the carrier foil 18, the following variants are possible proceeding from FIG. 5*b*. The ink coating 26 and the top-coat layer 28 and/or the ink coating 36 and the top-coat layer 38 can be formed by an ink coating 26 or 36 with—in particular planar—upper surface. The ink coating 26 and/or 36 comprises a reflective partial layer (such as metallization), which follows its relief structure with both surfaces, as well as a partial layer with glazing ink, whose lower surface follows the relief structure, while the upper surface of the glazing ink partial layer does not follow the relief structure, preferably is configured to be planar. In a further variant, an upper, color-glazing partial layer of the lower ink coating 26 in FIG. 5*b* forms the lower top-coat layer 28 and at the same time the upper embossing lacquer layer 32. The ink coating 26 preferably in turn comprises a reflective partial layer (such as metallization), which follows its relief structure with both surfaces. A glazingly dyed partial layer, preferably an embossing lacquer layer, of the ink coating 26 follows the lower relief structure 24 with its lower surface and the upper relief structure 34 with its upper surface. In an even further variant, the lower ink coating comprises at least (or precisely) three partial layers, a reflective partial layer, a compensating partial layer and a partial layer with a glazing ink, preferably dyed embossing lacquer. The reflective partial layer follows the second, lower relief structure 24 with one (or both) surface(s) and the color-glazing partial layer follows the first, upper relief structure 34 with its upper side.

In other configurations, two foils 18-A, 18-B can also be used in the manufacture of the security element, each of which foils is supplied separately with one of the micromirror structures 22-28 or 32-38 and then suitably laminated together.

In the security element 54 of FIG. 5(*c*), the two carrier foils 18-A, 18-B are laminated together in such a manner that the micromirror structures 22-28 and 32-38 are disposed on the inside. The lamination 56 can comprise a laminating foil or it can be formed only by a laminating adhesive. In this configuration, one or both of the carrier foils 18-A, 18-B can be peeled off after the lamination in order to configure the security element 54 to be as thin as possible. In particular when employing a laminating foil, even both carrier foils 18-A, 18-B can be peeled off, since the stability of the security element 54 is ensured by the laminating foil, which then acts as an areal carrier of the security element. The security element 54 is also constructed for viewing from the side of the ink coating 36, so that the ink coating 36 of the micromirror arrangement disposed at a higher level 34 is supplied with large-area recesses 42 in which the viewer looks at the micromirror arrangement disposed at a lower level 24 with the ink coating 26.

In the security element 58 of FIG. 5(*d*), the carrier foils 18-A, 18-B are laminated together in such a manner that one micromirror structure 22-28 is disposed on the inside and the other micromirror structure 32-38 is disposed on the outside. The lamination 56 can comprise a laminating foil or be formed only by a laminating adhesive. The carrier foil 18-A located on the outside can be peeled off after lamination in order to configure the security element 58 to be as thin as possible. The large-area recesses 42 are provided also here in the ink coating 36 of the micromirror arrangement disposed at a higher level 34, in order to enable the viewer to look at the micromirror arrangement disposed at a lower level 24 with the ink coating 26.

A further variant, not shown in the figures, finally consists in laminating the carrier foils together in such a manner that both micromirror structures 22-28 or 32-38, 42 are disposed on the outside.

As already explained in more detail above, the ink coatings 26, 36 can be formed not only by glazing inks, but also, for example, by metallizations, by thin-film structures, by glazing inks backed with a metallization, by luminescent inks with metallic mirroring, by structural inks or by nanoparticle inks.

As also already stated, the carrier foil 18 is an optional element. It can therefore be omitted in each of the variants shown, mentioned, or following. For example, the carrier foil 18 in FIG. 5(*b*), the carrier foil(s) 18-AB in FIG. 5(*c*) or the carrier foil 18-A in FIG. 5(*d*) can be removed before (or after) an application of the security element to a target substrate. A release layer, not shown, which is disposed between the carrier foil and the further layers, is provided in such configurations.

The security elements according to the invention can additionally include regions with negative markings, for example a negative writing, as illustrated by means of the FIGS. 6 and 7. For the sake of simplification, in these figures only the micromirror arrangements 22-28 and 32-38 are represented without carrier foils or further layers of the layer structure.

The security element 60 of FIG. 6 is fundamentally structured like the security element 12 of FIG. 2, in particular the ink coating 36 of the micromirror arrangement disposed at a higher level 34 includes in partial regions 16 recesses 42 which are arranged above coated regions 26 of the micromirror arrangement disposed at a lower level 24 and produce the color-to-effect registration described above. Additionally, the security element 60 has also partial regions 62 in which the ink coatings 26, 36 of both micromirror arrangements 24, 34 are recessed (recesses 44 and 42) so that the security element 60 does not show any of the color impressions of the two ink coatings in these regions.

The shape of the partial regions 62 forms a negative marking, in particular a negative writing, which can be recognized particularly well in transmitted light with an at least translucent configuration of the further layers of the security element. In the partial regions 62, the recesses 44 of the ink coating 26 of the micromirror arrangement disposed at a lower level 24 are formed with a slightly larger area than the associated recesses 42 in the ink coating 36 in order to absorb register fluctuations between the two embossed structures 24, 34. The line widths of the recesses 42, 44 disposed one above the other are greater than 100 μm, in particular greater than 300 μm, in order to ensure that the negative markings can be easily recognized.

Colored negative markings can be provided as well, as illustrated by means of the security element 70 of FIG. 7. In this embodiment example, the ink coating 26 of the micromirror arrangement disposed at a lower level 24 is composed of a glazing ink 74 backed with a metallization 72. In the partial regions 16 the recesses 42 of the ink coating 36, like in FIG. 6, are disposed above fully coated regions 26 of the micromirror arrangement disposed at a lower level 24, so that in these partial regions there results the already described color-to-effect registration.

Additionally, the security element 70 includes partial regions 76 in which, in addition to the ink coating 36 of the micromirror arrangement disposed at a higher level 34, the metallization 72 of the ink coating 26 of the micromirror arrangement disposed at a lower level 24 is also recessed, but the glazing ink 74 is retained. While the security element 70 appears to be colored and opaque in the partial regions 16 through the metallization 72, the partial regions 76 are colored and translucent due to the lack of metallization 72 there. The shape of the partial regions 76 thus forms a colored negative marking, in particular a negative writing, which can be recognized particularly well in transmitted light with an at least translucent configuration of the further layers of the security element. In the embodiment example of FIG. 7 as well, the recesses in the metallization 72 are advantageously configured with a slightly larger area than the recesses 42 in the ink coating 36 in order to absorb register fluctuations. The line widths of the recesses disposed one above the other also are preferably greater than 100 μm, in particular greater than 300 μm, in order to ensure that the colored negative markings can be easily recognized.

The invention claimed is:

1. An optically variable security element, a surface expansion of which defines a z axis standing perpendicularly thereon, with a multicolored, reflective areal region, wherein
the reflective areal region includes a first relief structure disposed at a higher level and a second relief structure disposed at a lower level, which are arranged at different height levels in a z direction along the z axis;
the first relief structure is supplied with a first ink coating and the second relief structure is supplied with a second, different ink coating;
the two relief structures overlap in an overlap region;
the first ink coating of the first relief structure disposed at the higher level in the overlap region has at least one recess, a dimension of which is more than 140 μm, wherein the first ink coating comprises an edge region adjoining the at least one recess; and
as a bicolor register feature the first relief structure lets the edge region of the first ink coating appear with a first color impression and the second relief structure through the at least one recess lets the second ink coating appear with a second, different color impression in mutual register;
wherein the first relief structure and/or the second relief structure comprises a non-diffractive micromirror arrangement.

2. The security element according to claim 1, wherein the dimensions of the recess are more than 250 μm.

3. The security element according to claim 1, wherein the reflective areal region includes exactly two relief structures, each of which is arranged at a specific height level.

4. The security element according to claim 1, wherein in a viewing angle range or at a second viewing angle the ink coatings appear in mutual register for a viewer.

5. The security element according to claim 1, wherein in a second viewing angle range or at a third viewing angle at least one of the two relief structures does not appear chromatically for a viewer.

6. The security element according to claim 1, wherein the second ink coating appears over a full area or partially, namely only adjoining the edge region in a viewing range defined by the recess and a viewing angle.

7. The security element according to claim 1, wherein the bicolor register feature forms an independent, optically variable feature or is integrated in an optically variable feature of the reflective areal region.

8. The security element according to claim 1, wherein the reflective areal region comprises two, three or more than three corresponding recesses, which are in particular matched to one another in order to form an optically variable feature of the reflective areal region.

9. The security element according to claim 1, wherein the relief structures are each characterized by a maximum pitch and a distance between adjacent height levels in the z direction is greater than the maximum pitch of the second relief structure disposed at the lower level between 150% and 750% of the maximum pitch of the second relief structure disposed at the lower level.

10. The security element according to claim 1, wherein the ink coatings are formed by glazing inks, by metalizations, thin-film structures, by glazing inks backed with a metallization, by luminescent inks with a metallic mirroring, by structural inks and/or by nanoparticle inks.

11. The security element according to claim 1, wherein in the overlap region there is additionally provided at least one partial region with a negative marking, in which the ink coating of the first relief structure disposed at the higher level and at least partially also the ink coating of the second relief structure disposed at the lower level are recessed.

12. The security element according to claim 11, wherein the ink coating of the second relief structure is completely recessed in the negative marking partial region, so that the negative marking does not produce any of the color impressions of the two ink coatings.

13. The security element according to claim 11, wherein the second ink coating of the second relief structure is configured to be multilayered and in the negative marking partial region at least one of the layers is recessed so that a colored negative marking is created.

14. The security element according to claim 13, wherein the ink coating of the second relief structure has an opaque partial layer, a metallization, and a translucent ink layer, and the opaque partial layer, but not the translucent ink layer, is recessed in the negative marking partial regions, so that a negative marking with the color effect of the translucent ink layer is created.

15. The security element according to claim 1, wherein the first and/or the second relief structure is a micromirror arrangement with directional micromirrors.

16. A data carrier with an optically variable security element according to claim 1.

17. A method for manufacturing an optically variable security element, the method comprising:
providing a carrier, an areal expansion of which defines an x-y plane and a z axis standing perpendicularly thereon,
supplying the carrier with a multicolored, reflective areal region which is formed with a first relief structure disposed at a higher level and a second relief structure disposed at a lower level in the z direction along the z axis with reference to the carrier, the first relief structure and the second relief structure arranged to overlap in an overlap region, wherein the first relief structure is supplied with a first ink coating and the second relief structure is supplied with a second, different ink coating, wherein the first ink coating of the first relief structure disposed at the higher level in the overlap region is configured with a recess, a dimension of which is more than 140 μm, wherein the ink coating of the first relief structure disposed at the higher level comprises an edge region adjoining the recess, and as a bicolor register feature the first relief structure is configured so that the edge region of the first ink coating is configured with a first color impression and the second relief structure is configured such that the second ink coating appears through the recess with a second, different color impression in mutual register, wherein the first relief structure and/or the second relief structure comprises a non-diffractive micromirror arrangement.

18. An optically variable security element, a surface expansion of which defines a z axis standing perpendicularly thereon, with a multicolored, reflective areal region, wherein the reflective areal region includes a first relief structure disposed at a higher level and a second relief structure disposed at a lower level, which are arranged at different height levels in the z direction along the z axis;

the first relief structure is supplied with a first ink coating and the second relief structure is supplied with a second, different ink coating;

the two relief structures overlap in an overlap region;

the first ink coating of the first relief structure disposed at a higher level in the overlap region has at least one recess, a dimension of which is more than 140 μm, wherein the first ink coating comprises an edge region adjoining the recess; and as a bicolor register feature the first relief structure lets the edge region of the first ink coating appear with a first color impression and the second relief structure through the recess lets the second ink coating appear with a second, different color impression in mutual register;

wherein in the overlap region there is additionally provided at least one partial region with a negative marking, in which the first ink coating of the first relief structure disposed at the higher level and at least partially also the second ink coating of the second relief structure disposed at the lower level are recessed.

* * * * *